March 17, 1936. E. ALTENKIRCH Re. 19,888

ABSORPTION APPARATUS

Original Filed June 8, 1929

Inventor:
Edmund Altenkirch
By Harry S. Demarce
Atty.

Reissued Mar. 17, 1936 Re. 19,888

UNITED STATES PATENT OFFICE 19,888

ABSORPTION APPARATUS

Edmund Altenkirch, Neuenhagen, near Berlin, Germany, assignor, by mesne assignments, to The Hoover Company, North Canton, Ohio, a corporation of Ohio Original application June 8, 1929, Serial No. 369,358, Patent No. 1,887,957, dated November 15, 1932. Divided and application October 9, 1930, Serial No. 487,465, Patent No. 1,887,909, dated November 15, 1932. Application for reissue October 11, 1934, Serial No. 747,858. In Germany June 16, 1928

26 Claims. (Cl. 62—119.5)

My invention relates to absorption apparatus.

It is known in the art to construct continuously operating absorption apparatus, particularly refrigerating apparatus in such a manner that the differences of pressure between the evaporator and the absorber on the one hand and between the generator and the condenser or resorber on the other hand are more or less equalized by the presence of a neutral or inert gas in the evaporator and absorber. In the known absorption apparatus the absorption solutions as well as the neutral gas are circulated in closed circuits. The present application is a continuation in part of my co-pending application for patent Serial No. 369,358, filed June 8, 1929, on which Patent 1,887,957 was granted November 15, 1932, and for which application 745,929 filed September 28, 1934 is an application for reissue. The present subject matter relates more particularly to an absorption apparatus of the kind mentioned, in which the gaseous working medium or refrigerant development in a generator is absorbed in a resorber by an absorption solution and is evaporated in an evaporator from the absorption solution. In contrast to the hitherto known absorption apparatus, the delevopment of the gaseous working medium in the generator takes place—at least partly—in the presence of a neutral gas.

The advantage obtained by the presence of neutral gas in the generator, is as follows:

The mixture of gaseous working medium and neutral gas entering the generator may be so proportional that the partial pressure of the gaseous working medium is very low. Generation of gaseous working medium can then be effected without having to raise the final temperature of the generator as high as is necessary with generators without an admixture of gas. The extensive degasification of the absorption solution is of great importance for good absorbing action in the absorber. The reduction of the final temperature of the generator is also useful on account of the danger of decomposition of the gaseous working medium (e. g. ammonia) at high temperatures, such as are ordinarily necessary, particularly with air-cooled absorption refrigerators.

The inert gas in the generator may circulate between that vessel and a resorber. If, however, several generators and several absorbers are employed, a generator and an absorber may be connected together to form a circulation system for gas mixture. It is also possible to connect one or more generators with a resorber and one or more absorbers as to form a common system for the circulation of gas mixture. Best results are obtained if the gas mixture is made to circulate in counterflow to the absorption solution, so that the gas mixture deprived, as much as possible, of gaseous working medium in the resorber is first brought into contact with the absorption solution leaving the absorber.

The circulation of the gas mixture between the generator and the absorber or between the generator and the resorber, may easily be brought about by the heating in the generator. To facilitate this circulation, the absorber and the resorber may be disposed at a higher level than the generator. As an indifferent gas, one heavier than the gaseous working medium may be employed.

Accordingly, it is one object of the invention to provide a continuous absorption refrigerating system with an arrangement for circulating inert gas through the generator.

It is another object of the invention to provide an absorption refrigerating system capable of wide variation in operating characteristics, such as quantity heat input, temperature of heat input, capacity, operating efficiency, etc.

Further details, possibilities of construction and advantages of the invention are contained in the following description, and in the accompanying drawing, which illustrates the invention, in part schematically, and partly in a form approaching the actual construction. In all figures of the drawing, the manner in which the individual vessels are connected with one another is illustrated. The arrowed dash-dot lines represent gas mixture circuits, the arrowed continuous lines represent liquid circuits.

Fig. 1 is the diagram of an absorption apparatus in which an absorber and an evaporator are connected with one another to form a gas-mixture circulation system, and a generator and a resorber to form another gas-mixture circulation system, and in which the circulation of the absorption solution of the one range of concentration leads through the generator and the absorber and that of the other range of concentration through the resorber and the evaporator.

Figure 6:
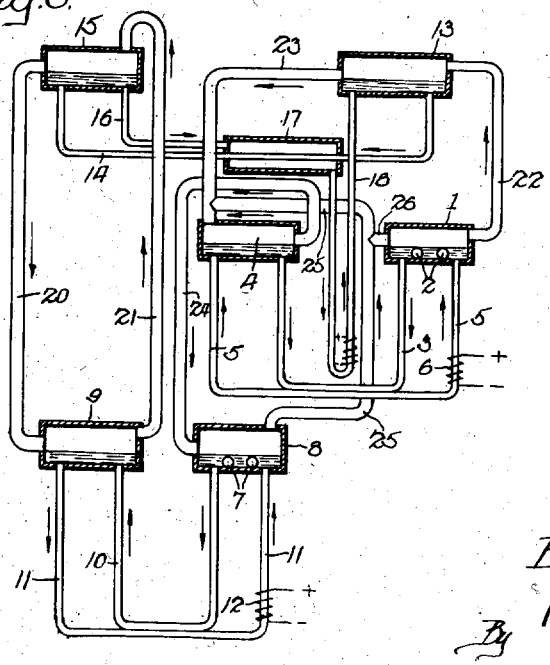
Figure 5:
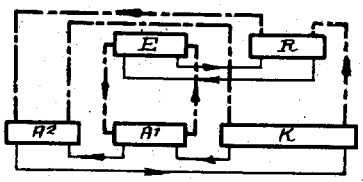

Fig. 5 is the diagram of an absorption refrigerating apparatus with one generator, two absorbers, one resorber and one evaporator, in which the generator is connected with the resorber and one of the two absorbers, and the other absorber with the evaporator in such a manner that each of the groups forms a closed gas-mixture circulating system, and Fig. 6 shows an absorption refrigerating apparatus constructed in accordance with the present invention. It illustrates the arrangement of the various vessels and connecting pipes substantially in the form of a practical apparatus.

In the following description, the invention will be described as applied to the production of refrigeration although it is to be understood that it is not limited in this respect. Throughout the specification and claims where the words "working medium" or "refrigerant" are used, the same thing is meant. Likewise, the words "indifferent gas", "neutral gas" and "inert gas" refer to the same thing and the expression "gas-mixture" means a mixture of inert gas and refrigerant gas.

Ordinarily, herein, where the solution is referred to as having a high concentration, a high refrigerant content is meant but where sulphuric acid is specifically mentioned for use as absorbent and water as refrigerant, the concentration will be referred to herein as concentrated or strong when the sulphuric acid content is high.

Figure 1:
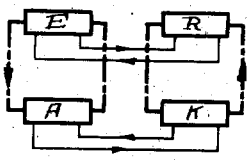

The essence of the invention is simple to explain with reference to the schematic Fig. 1. In that figure the generator is indicated by K, the absorber by A, the resorber by R and the evaporator by E. Let us assume, for example, that the solvent consists of sulphuric acid, the working medium of water, the neutral gas in the generator and resorber of nitrogen, and that in the evaporator and absorber of hydrogen, and further that the sulphuric acid solution, deprived of water to a great extent, flowing from the generator K to the absorber A exchanges its heat with the solution enriched with working medium and flowing from the absorber to the generator. We also assume that the very watery solution, flowing from the resorber to the evaporator exchanges heat with the solution coming back from the evaporator to the resorber. For simplicity, the heat exchange has not been indicated in the drawing; but might be inferred from the close proximity of the pertaining lines.

The absorption machine schematically illustrated in Fig. 1 operates as follows:

When heat is imparted to the aqueous sulphuric acid solution in the generator K, steam develops into the admixed nitrogen. The sulphuric acid, which has become more concentrated owing to the evaporation of water, then passes into the absorber A. The gas mixture containing nitrogen becomes heated through coming into contact with the absorption solution in the generator K and also becomes lighter owing to the steam it now contains. It therefore rises into the resorber R where it gives up to the sulphuric acid solution coming from the evaporator E the steam which it took from the generator. The absorption heat produced is carried off by cooling water or air. The gas mixture more or less deprived of steam returns to the generator K, whereas the sulphuric acid, weakened by the water it has taken up, passes into the evaporator E, where it gives up to the admixed hydrogen the steam it contains and thereby produces useful refrigeration. In doing so the gas mixture becomes heavier and descends into the absorber A, where the steam is absorbed by the concentrated sulphuric acid coming from the generator K; the heat produced thereby being here also carried away by cooling water or air. The gas mixture which is now freed from steam and has been heated in the absorber rises again into the evaporator. In all vessels, the absorption solution and the gas mixture flow, as shown by arrows, in counterflow to each other.

The total pressure in the two gas circulation systems may be different, or may be the same. If it is different, the difference of pressure is maintained in a known manner, for instance, by means of liquid columns. For example in case of an underpressure in the absorber the latter would be placed higher than the generator, and if there is an underpressure in the evaporator, it would be placed higher than the resorber.

It simplifies matters, if in the different gas-mixture circulation systems neutral gas of the same kind is used, and the total pressure is maintained at an equal value in both systems.

The gaseous working medium is absorbed in the resorber from the gas mixture by the solution at a partial pressure corresponding to the temperature of the cooling means. From the solution it again evaporates into neutral gas in the same range of concentration in a zone of a lower partial pressure. It has hitherto been assumed that the gaseous working means is developed in the generator at a pressure corresponding to the partial pressure of the resorber and was fed to the neutral gas. The invention however gains considerably in importance if a third (higher) pressure zone or partial pressure zone is provided, in which gaseous working medium is developed and liquefied, the latter for instance through absorption in a resorber. This zone of highest pressure may be used with or without indifferent gas.

The arrangement of the third zone of higher pressure permits a considerable reduction of the temperature of the heat supplied. This reduction is, for instance of advantage where the absorption apparatus is operated with waste heat.

Figure 2:
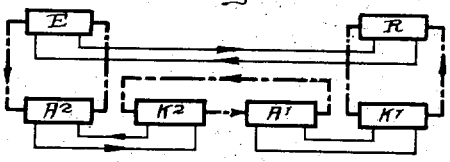
Fig. 2 is the diagram of an absorption refrigerating apparatus, in which a generator and a resorber, a second generator and an absorber and a second absorber and an evaporator are connected together respectively in pairs, each of the pairs mentioned having a gas mixture circulation system.

Assuming the refrigerant is generated in the presence of an indifferent gas, the refrigerant pressure, at which this takes place may be higher than that at which it is absorbed, but lower than the pressure at which the liquefying or resorption takes place. This case is illustrated in Fig. 2 of the drawing. The generation and absorption of the gaseous working medium takes place here in two separate pressure stages. For this purpose, besides an evaporator E and a resorber R, two generators $K_1$ and $K_2$ as well as two absorbers $A_1$ and $A_2$ are provided. With this arrangement, it is made possible for the working medium generated in the generator $K_2$, in the medium partial pressure zone, instead of going into a condenser or resorber, to pass into the absorber $A_1$ through the agency of the indifferent gas, into which it was developed when being generated. In the absorber $A_1$ it is reabsorbed in presence of indifferent gas at a medium temperature and a medium partial pressure. As the partial pressure in the absorber $A_1$ corresponds to the partial pressure in the generator $K_2$ and is, therefore, considerably higher than in the absorber $A_2$ (which is connected with the generator $K_2$ so as to form a liquid circulation system, and the partial pressure of which corresponds to the partial pressure in the evaporator E), the solution in $A_1$ will be considerably more enriched with working medium.

Consequently, the temperature in the generator $K_1$ operating at a still higher partial pressure can be considerably reduced, without impairing the evaporator temperature.

In the arrangement of Fig. 2, there are three separate absorption solution circuits and three separate inert gas circuits. In each solution circuit the refrigerant is absorbed from inert gas at one temperature range and at one refrigerant partial pressure zone and expelled into inert gas at another temperature range and another partial pressure zone. In each solution circuit the concentration of solution varies over the same concentration range during the absorption and expulsion. That is, the same amount of refrigerant is expelled from any one solution circuit as is absorbed by that circuit.

By controlling the inert gas partial pressures in the three inert gas circuits, the refrigerant partial pressure in the evaporator E and the absorber $A_2$ is maintained low; the refrigerant partial pressure in the boiler $K_2$ and the absorber $A_1$ is maintained at a medium or intermediate pressure; and the refrigerant partial pressure in the boiler $K_1$ and resorber R is maintained high.

The absorption solution circulating between the absorber $A_2$ and the boiler $K_2$ has a low range of refrigerant concentration; that circulating between the absorber $A_1$ and the boiler $K_1$, a medium or intermediate range of refrigerant concentration; and that circulating between the resorber R and the evaporator E, a high range of concentration. In any continuous absorption system means must be provided for transferring the refrigerant from the low refrigerant pressure zone of the evaporator to the high refrigerant pressure zone of the resorber (in this connection a condenser may be regarded as a special form of resorber). The arrangement of Fig. 2 provides what may be termed a multistage or compound boiler-absorber for doing this. The refrigerant absorbed in the absorber $A_2$ is expelled in the boiler $K_2$ and conveyed into the absorber $A_1$ to be there absorbed into a solution of a higher refrigerant concentration range than that in the absorber $A_2$. The refrigerant absorbed in absorber $A_1$ is expelled in the boiler $K_1$ and conveyed to the resorber. Because inert gas is present in boiler $K_2$, the refrigerant partial pressure in this vessel is low and the boiler $K_2$ can operate at a relatively low temperature. Because the solution supplied to the boiler $K_1$ is of a refrigerant concentration higher than it would be if it were coming directly from absorber $A_2$, it likewise can operate at a relatively low temperature.

If the arrangement of Fig. 2 is modified so that inert gas is eliminated from the boiler $K_2$ and resorber R, a condenser substituted for the resorber and the two solution circuits through the multi-stage boiler absorber system combined into one, the arrangement of applicant's copending application Serial No. 692,373 filed October 6, 1933 (now Patent No. 2,000,005 granted June 7, 1935) is obtained. The system of this copending application may therefore be said to embody a specific form of the present invention.

If the system of Fig. 2 is operated as a heating means instead of a refrigerator, a high temperature of the heat output can be obtained.

It is only important that there should be a generator, in which the partial pressure, at which the gaseous working medium is developed from the solution of the same concentration range into the indifferent gas, is higher than the partial pressure at which the working medium is absorbed from the gas mixture by the solution, but is at the same time lower than the pressure or partial pressure, at which the liquefying or resorption preceding the evaporation or de-gasification takes place in the working medium circuit.

Figure 3:
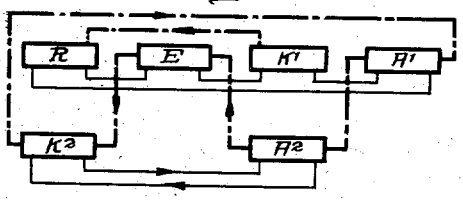
Fig. 3 is the diagram of an absorption refrigerating apparatus with two generators, two absorbers, one resorber and one evaporator in which the evaporator is connected with one of the two generators and with both absorbers so as to constitute a common gas-mixture circulation system, while the resorber and the other generator are free of indifferent gas.

The solution circuit of the intermediate concentration range (that which includes the absorber $A_1$ and boiler $K_1$) of Fig. 2 may be combined with the solution circuit of high refrigerant concentration range (that which includes the resorber R and the evaporator E) Fig. 3 illustrates a special adaptation of such a system in which the use of inert gas in the generator $K_1$ and the resorber is dispensed with, and the remaining inert gas circuits combined into one.

A liquid circuit connects the generator $K_2$ of the medium partial pressure zone to the absorber $A_2$ of the lowest partial pressure zone. A second liquid circuit traverses the generator $K_1$, the evaporator E, the resorber R and the absorber $A_1$ in series. Thus the solution with lower refrigerant content, flows from the evaporator E directly to the generator $K_1$.

The lowest partial pressure zone includes the evaporator E and absorber $A_2$, and the medium partial pressure zone includes generator $K_2$ and absorber $A_1$. This gas mixture flows from the absorber $A_2$ to the evaporator E, from there to the generator $K_2$ and finally through the absorber $A_1$ back to the absorber $A_2$. The absorption solution flows, as the arrows show, in the range of the stronger refrigerant concentration, from resorber R into evaporator E, from there into the generator $K_1$, then into absorber $A_1$ and finally back into resorber R. A perfect operation of this absorption refrigerating machine presupposes, as a matter of course, a good exchange of heat between the absorption solutions as well as between the gas mixtures, which circulate between the warm and cold parts of the machine.

Figure 4:
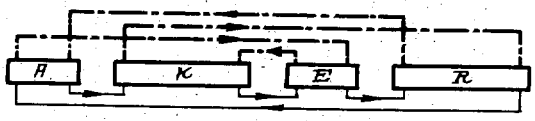
Fig. 4 is the diagram of an absorption apparatus suitable for the discharge of heat at a high temperature, with one generator, one absorber, one resorber and one evaporator, i. e. with the same constituent parts as in Fig. 1, but in which all the vessels are connected with one another to form a single liquid circulation system and to form a single, closed gas-mixture circuit.

The greatest simplicity of the liquid circulation as well as of the gas mixture circulation is obtained by combining all of the liquid circuits into one, and all of the gas mixture circuits into one. Fig. 4 shows such a system.

Heat is transmitted at a mean temperature to the generator K and to the evaporator E. The absorption solution flows, as the arrows show, from E into the resorber R, where it meets the gas mixture which is enriched by gaseous working medium in the generator K. By the absorption of the working medium from the gas mixture in the resorber R, heat of high temperature is produced which can be delivered to the outside. The gas mixture in the resorber R, partially freed of the working medium passes now into the absorber A, operating at a low temperature, where, in a low partial pressure zone of the working medium, the solution enriched by the working medium in the resorber R, will be still further enriched from the gas mixture. The solution is then returned at a mean temperature to the generator K for the purpose of renewed development of a gaseous working medium. The gas mixture in the absorber A, freed to a great extent of the working medium passes into the evaporator E, and through the heat of a mean temperature brings about a thorough degassing of the absorption solution in the latter. The greatly impoverished absorption solution will be thereby capable, when reaching resorber R, to absorb therein working medium from the rich gas mixture supplied from generator K.

In order that a comparatively great amount of heat of high temperature may be produced with the least possible extraction of heat at low temperature supplied from outside it is indispensable that the liquid as well as the gas mixture form closed circuits, that they exchange heat with one another and that they be dimensioned properly with regard to their quantities as required for the various concentration ranges and partial pressure zones.

Fig. 5 shows schematically an absorption refrigerating system in which the two liquid circuits of the two absorber systems of Fig. 2 are combined. Likewise two of the three circuits which, in Fig. 2 are independent, are combined, the gas mixture circuit between the medium and the low temperature range remaining separate. The absorbers remain separated but the two generators of Fig. 2 are combined into one.

A number of the gas mixture circuits, described above, run through a chamber of especially high temperature. This facilitates the circulation of the gas mixture. This is particularly true for the generator of the higher partial pressure zone and for the resorbers. Care should be taken, by means of a heat exchanger between the gas mixture flowing to the generator or the resorber and gas mixture flowing from the generator or the resorber and gas mixture flowing from the generator or the resorber not to have valuable heat carried off or the cold lost. It should, however, be observed, that, with the majority of the gas mixture circuits disclosed, the partial pressure range, which they traverse in two or three different pressure zones, is so considerable, that the quantity of the circulating gas involved may be comparatively insignificant. For this reason a heat exchanger between the circulating gas mixture may be dispensed with in many cases without great loss. The same applies also to the circulation of the absorption solution between the various temperature ranges.

For the circulation of the absorption solution various means can be employed, all of which are well known for similar purposes. If for instance the pressure in the chambers, where working medium under high pressure is absorbed from the gas mixture, is higher than in the chambers of the same liquid circulating system, where gaseous working medium is developed out of the absorption solution into the neutral gas, this difference of pressure can be maintained by means of liquid columns (columns of flowing absorption solution). A liquid circuit is then established as a result of the different specific weights of the rich and of the poor solution. In cases in which the several gas mixture circuits are combined, it is not possible to maintain such a difference of pressure. In order to bring about the desired liquid circulation the different vessels should then be connected by some means such as U-pipes which may exchange heat with the indifferent gas. The circulation may be brought about by heating the solution in the rising limb of the U-pipe, which carries the solution for instance into the chamber, which belongs to the higher temperature range. An example of this type of liquid circulation is given in the arrangement according to Fig. 6, which will be explained in the following:

The absorption apparatus shown in Fig. 6 is one somewhat like that schematically illustrated in Fig. 2. Similar to Fig. 2, an evaporator and a resorber are provided, and two generators and two absorbers. The evaporator is connected with the resorber by a liquid circulating system for the absorption solution of the higher refrigerant concentration range. Each of the two generators is connected with its respective absorber by a liquid circulating system for absorption solution. The evaporator is connected to one of the two absorbers so as to form a gas mixture circulating system. Inert gas also circulates between the other absorber and one of the two generators, and between the other generator and the resorber.

The arrangement of Fig. 6 differs from that in Fig. 2 in the manner in which the inert gas circulates in the zones of intermediate and high refrigerant partial pressure. In the arrangement of Fig. 2 the inert gas circuits in these two zones are maintained separate, one inert gas circuit including $K_2$ and $A_1$ (the zone of intermediate refrigerant partial pressure) and another inert gas circuit including $K_1$ and R (the zone of high refrigerant partial pressure). In Fig. 6, these two circuits are combined although the vessels forming a part thereof are not connected in series. All of the inert gas which flows through the resorber of Fig. 6 passes through the absorber which corresponds to the absorber $A_1$ of Fig. 2 and through the boiler which corresponds to the boiler $K_2$ of Fig. 2. From this boiler, the inert gas divides, part flowing to the boiler which corresponds to $K_1$ of Fig. 2 and part flowing to the absorber which corresponds to $A_1$. The system is not the same as that of Fig. 2, therefore, but is a modification of it.

In Fig. 6, 1 is the generator of the highest partial pressure zone, heated by two heating elements 2. Like the other vessels it is of the horizontal type and, like the other vessels, the connections are such that a counter current of gas mixture and absorption liquid results. The absorption solution flows from the generator 1 through a U-shaped liquid pipe 3 into absorber 4 of the medium partial pressure zone and thence it flows back into the generator 1 by means of a liquid pipe 5 which is in heat exchange relation with the pipe 3. The circulation is caused by a heating element 6 arranged in the lower part of the rising limb of the pipe 5. The heating element can be connected to an electrical source of energy.

Like the vessels 1 and 4, the generator 8 of the medium partial pressure zone, (heated by heating elements 7) and the absorber 9 of the low partial pressure zone are connected by means of the liquid pipes 10 and 11, which are in heat exchange relation with one another. 12 denotes a heating element, arranged on the rising limb of the U-shaped liquid pipe 11. From the resorber 13 the absorption liquid flows through a liquid pipe 14 into the evaporator 15 and thence through the liquid conduits 16, 17, 18 back to the resorber 13. The conduit 17 surrounds the pipe 14 and forms with the latter a heat exchanger. The pipe 18 is U-shaped. The rising limb can be heated by means of a heating element 19. The absorber 9 is connected to the evaporator by the gas pipes 20 and 21. The inlets of these pipes into the gas chamber of the vessels 9 and 15 are such that, an indifferent gas (for instance hydrogen) which is lighter than the gaseous working medium (for instance ammonia), circulates automatically as a result of the difference in the molecular weights and as a result of the changes of the specific weight of the gas columns, caused by the difference in temperature. The generator 1 is connected to the resorber 13 by means of a gas pipe 22, which delivers the gas mixture, enriched with gaseous working medium, to the resorber.

For carrying off the indifferent gas from the resorber 13, a gas pipe 23 is connected to the top of absorber 4. From the absorber 4 a gas pipe 24 runs to the generator 8 and from this generator a gas pipe 25 runs to the top of absorber 4, where it joins the aforementioned gas pipe 23. A further gas pipe 26, which branches off from the pipe 25, connects with generator 1.

It is assumed that the inert gas in the circuit which includes the vessels 1, 4, 8 and 13 is heavier than the refrigerant gas, and that the refrigerant is ammonia. The gas mixture in the vessels 1 and 8, in which the ammonia vapour is developed and admixed to the indifferent gas, will be lighter than in the vessels of these circuits, in which it is deprived of the greater part of ammonia by absorption. Moreover since vessels 1 and 8 lie in the highest range of temperature the rising of the gas mixture to the resorber 13 or absorber 4 will be favoured by the heating in the generators. The gas current which flows upward through the pipe 25 is divided into two parts. One part flows through the pipe 26 to the generator 1, pipe 22, resorber 13 and the pipe 23, into absorber 4, while the other part flows directly to absorber 4, at the top of which it again joins the part flowing through pipe 23. In this manner a greater amount of gas mixture circulates through the vessels 4 and 8 than through the vessels 1 and 13.

Besides this particular example of a combination of several gas mixture cycles, a number of other modifications of the invention are possible in this respect.

It is possible in the case of an absorption refrigerating apparatus which possesses, as illustrated in Fig. 4, two generators and two absorbers but only one evaporator and one resorber—to combine the generator of the highest pressure stage, operating without admixture of the indifferent gas (such as $K_1$ in Fig. 4) with the second generator and both absorbers in a liquid circulating system, which is completely separated from the liquid circulating circuit, in which liquid of the other concentration range circulates. In this case it is possible to have two gas mixture circulating circuits, separated one from another, one of which connects the evaporator and one of the two absorbers with one another in the low partial pressure zone, and the other of which includes both absorbers as well as the generator of the middle partial pressure zone.

In the above mentioned examples three ranges of temperature are involved, between which the absorption solutions or gas mixtures circulate. The invention is not, however, limited thereto.

As it is possible without difficulty for two different evaporator temperatures or two entirely different generator temperatures to coexist, other ranges of temperature can be easily added to those already described. This improvement may be of great importance if, for instance, by adding the third pressure zone, a low evaporator temperature is maintained at one place but with a portion of the cold produced at a somewhat higher temperature.

Such is the case for instance with a domestic refrigerator where the cooling of the cooling chamber occurs a temperature of 2 to 4 centigrades above zero, but where a temperature of at least 5 centigrades below zero must be produced in the evaporator for the production of ice. One evaporator can be then operated for instance at a temperature of 8 centigrades below zero, the other at a temperature of zero centigrade. In this case therefore we deal with four ranges of temperature.

If it is of importance to lower the temperature slightly for the production of cold or to considerably reduce the generator temperature, the intended effect may be obtained by adding other pressure or partial pressure zones so far as it lies within the limits of practicability.

I claim as my invention:

1. In an absorption machine containing a working medium, a solvent for said medium and an indifferent gas not absorbable by said solvent, a generator system comprising a plurality of generators, at least one generator being used for developing gaseous medium from absorption solution of a first concentration range, a resorber system comprising at least one resorber for absorbing said developed gaseous medium into absorption solution of a second concentration range, an evaporator for evaporating working medium from the absorption solution of the second concentration range, an absorber for absorbing evaporated gaseous medium to form absorption solution of the first concentration range, pipes connecting the aforementioned elements to form a closed circulation system for said working medium, connecting pipes between the generator system and said absorber to permit circulation of the absorption solution of the first concentration range, connecting pipes between the resorber system and said evaporator to permit circulation of the absorption solution of the second concentration range, the evaporation of working medium in the evaporator, and the absorption of gaseous medium in the absorber occurring in the presence of said indifferent gas, the development of gaseous medium from absorption solution of the first concentration range occurring in at least a portion of the generator system in the presence of indifferent gas.

2. In an absorption machine containing a working medium, a solvent for said medium and an indifferent gas not absorbable by said solvent, a generator system comprising a plurality of generators, at least one generator being used for developing gaseous medium from absorption solution of a first concentration range, a resorber system comprising at least one resorber for absorbing said developed gaseous medium in absorption solution of a second concentration range, an evaporator for evaporating working medium from the absorption solution of the second concentration range, an absorber for absorbing evaporated gaseous medium to form absorption solution of the first concentration range, pipes connecting the individual parts of the absorption machine to form a closed circulation system for said working medium, connecting pipes between said generator system and said absorber to permit circulation of the absorption solution of the first concentration range, connecting pipes between the said resorber system and said evaporator to permit circulation of the absorption solution of the second concentration range, the evaporation of working medium in the evaporator, and the absorption of gaseous medium in the absorber occurring in the presence of said indifferent gas, the development of gaseous medium from absorption solution of the first concentration range in the generator system occurring in the presence of indifferent gas, and connecting pipes between at least a portion of the generator system and at least a portion of said resorber system to render possible circulation of the indifferent gas through a generator and a resorber.

3. In an absorption machine containing a working medium, a solvent for said medium and an indifferent gas not absorbable by said solvent, a generator system comprising at least one generator for developing gaseous medium from absorption solution, a resorber system comprising at least one resorber for absorbing gaseous medium in absorption solution, an evaporator for evaporating working medium from the absorption solution, an absorber for absorbing gaseous medium to form absorption solution, pipes connecting the individual parts of the absorption machine to form a circulation system for said working medium, said solvent and said gas, the evaporation of working medium in said evaporator, and the absorption of gaseous medium in said absorber occurring in the presence of said indifferent gas, the development of gaseous medium from absorption solution in at least a part of said generator system, occurring in the presence of indifferent gas, said connecting pipes including connections between that part of said generator and said absorber to permit circulation of the indifferent gas through said part of the generator system and the absorber.

4. In an absorption machine containing a working medium, a solvent for said medium and an indifferent gas not absorbable by said solvent, a generator system comprising at least one generator for developing gaseous medium from absorption solution of a first concentration range, a resorber system comprising at least one resorber for absorbing said developed gaseous medium in absorption solution of a second concentration range, an evaporator for evaporating working medium from the absorption solution of the second concentration range, an absorber for absorbing said evaporated gaseous medium to form absorption solution of the first concentration range, pipes connecting the individual parts of the absorption machine to form a closed circulation system for said working medium, connecting pipes between said generator system and said absorber to permit circulation of the absorption solution of the first concentration range, connecting pipes between said resorber system and said evaporator to permit circulation of the absorption solution of the second concentration range, the evaporation of working medium in said evaporator and the absorption of gaseous medium in said absorber occurring in the presence of said indifferent gas, the development of gaseous medium from absorption solution of the first concentration range in at least a part of said generator system occurring in the presence of indifferent gas, and connecting pipes between said part of the generator system, said resorber and said absorber to render possible a circulation of the indifferent gas through said generator part, said resorber and said absorber.

5. In an absorption machine containing a working medium, a solvent for said medium and an indifferent gas not absorbable by said solvent, a generator system comprising at least one generator for developing gaseous medium from absorption solution of a first concentration range, a resorber system comprising at least one resorber for absorbing said developed gaseous medium in absorption solution of a second concentration range, an evaporator for evaporating working medium from the absorption solution of the second concentration range, an absorber for absorbing evaporated gaseous medium to form absorption solution of the first concentration range, pipes connecting parts of the absorption machine to form a closed circulation system for said working medium, the evaporation of working medium in the evaporator, and the absorption of gaseous medium in the absorber occurring in the presence of said indifferent gas, the development of gaseous medium from absorption solution of the first concentration range in at least a part of said generator system occurring in the presence of indifferent gas, and connecting pipes between said part of the generator system, said evaporator and said absorber for establishing a uniform circulation of the indifferent gas through said vessels.

6. In an absorption machine containing a working medium, a solvent for said medium and an indifferent gas not absorbable by said solvent, a generator system comprising a plurality of generators, at least one generator being used for developing gaseous medium from absorption solution of a first concentration range, a resorber system comprising at least one resorber for absorbing developed gaseous medium in absorption solution of a second concentration range, an evaporator for evaporating working medium from the absorption solution of the second concentration range, an absorber for absorbing evaporated gaseous medium in absorption solution of the first concentration range, pipes connecting the aforesaid parts to form a closed circulation system for said working medium, connecting pipes between said generator system and said absorber to permit circulation of the absorption solution of the first concentration range, connecting pipes between the said resorber system and said evaporator to permit circulation of the absorption solution of the second concentration range, the evaporation of gaseous medium in the evaporator and the absorption of gaseous medium in the absorber occurring in the presence of said indifferent gas, the development of gaseous medium from absorption solution of the first concentration range in at least a portion of said generating system occurring in the presence of indifferent gas, the development of gaseous medium in the generator system and its conversion into a more dense fluid phase occurring at a partial pressure higher than the partial pressures of the gaseous working medium in the other vessels.

7. In an absorption machine containing a working medium, a solvent for said medium and an indifferent gas not absorbable by said solvent, a generator system comprising a plurality of generators at least one generator being used for developing gaseous medium from absorption solution of a first concentration range, a resorber system comprising at least one resorber for absorbing the developed gaseous medium in absorption solution of a second concentration range, an evaporator for evaporating working medium from the absorption solution of the second concentration range, an absorber for absorbing evaporated gaseous medium in absorption solution of the first concentration range, pipes connecting the aforementioned parts to form a closed circulation system for the said working medium, connecting pipes between said generator system and said absorber to permit circulation of the absorption solution of the first concentration range, connecting pipes between the said resorber system and said evaporator to permit circulation of the absorption solution of the second concentration range, the evaporation of working medium in the evaporator and the absorption of gaseous medium in the absorber occurring in the presence of said indifferent gas, the development of gaseous medium from absorption solution of the first concentration range in at least a portion of said generator system occurring in the presence of indifferent gas, the development of gaseous medium in the generator system, and its conversion into a more dense fluid phase occurring at a partial pressure higher than the partial pressures of the gaseous working medium in the other vessels, and said gas development occurring at a higher temperature than the gas development and absorption in the other vessels.

8. An absorption machine having a generator for developing gaseous working medium from an absorption solution of a first concentration range, an absorber for absorbing working medium by an absorption solution of the same concentration range, a second generator and a second absorber for respectively developing working medium from, and absorbing it into absorption solution of a second concentration range, an evaporator for evaporating working medium from absorption solution of a third concentration range, a resorber for absorbing said evaporated medium to form absorption solution of said third concentration range, the gaseous working medium in said generators, absorbers, evaporator and resorber having an indifferent gas admixed to it, connecting pipes between the said first generator and said resorber, connecting pipes between said second generator and said first absorber and between said second absorber and said evaporator to form gaseous mixture circuits through the vessels connected with one another.

9. An absorption machine, containing a generator and an absorber, a second generator and a second absorber, an evaporator and a resorber, said first generator being connected with said first absorber, said resorber and said evaporator so as to form a common circulation circuit for absorption solution, said second generator being connected with said second absorber to form a second circulation circuit for absorption solution, the gaseous working medium in the said two absorbers, the said second generator and the said evaporator having indifferent gas admixed to it, and connecting pipes between the said last named vessels to permit circulation of indifferent gas through them.

10. An absorption refrigerating machine, containing a generator and an absorber, a second generator and a second absorber, an evaporator and a resorber, connecting pipes between said evaporator and resorber to permit circulation of absorption solution through said two vessels, connecting pipes between said two generators and said two absorbers to permit circulation of absorption solution through the last-named vessels, the gaseous working medium in said evaporator and in one of the two absorbers having indifferent gas admixed to it, the gaseous working medium in said second generator and in the other of the two absorbers having indifferent gas admixed to it, and connecting pipes within the two groups of vessels to establish two circuits for the gas mixture, one through said evaporator and one of said absorbers, and the other through said other absorber and said generator.

11. An absorption refrigerating machine, containing a generator, a resorber, an evaporator and two absorbers, connecting pipes between said evaporator and said resorber to permit circulation of absorption solution through said last-named vessels, connecting pipes between said generator and one of said absorbers to permit circulation of solution through said generator and said absorber, the gaseous working medium in all said vessels having indifferent gas, admixed to it, connecting pipes between said evaporator and said one of said absorbers to establish circulation of indifferent gas through said last-named vessels, connecting pipes between said generator, said resorber and said other absorber to establish circulation of indifferent gas through said generator, said resorber and said absorber.

12. An absorption refrigerating machine having several different partial pressure zones in its constituent vessels and containing two generators, a resorber, an evaporator, and two absorbers, one of said generators and said resorber belonging to a high partial pressure zone, and one of said absorbers and said evaporator belonging to a low partial pressure zone, while the other generator and the other absorber belong to a medium partial pressure zone, connecting pipes to permit circulation of absorption solution between said resorber and said evaporator, connecting pipes for establishing a second solution circuit including said first generator and said second absorber, and connecting pipes for establishing a third solution circuit including said second generator and said first absorber, the gaseous working medium in all of said vessel having indifferent gas admixed to it, conecting pipes between said evaporator and said fist-mentioned absorber for establishing circulation of gas mixture through the lowest partial pressure zone vessels, connecting pipes between said second generator and said second absorber for establishing circulation of gas mixture through the medium partial pressure zone vessels, connecting pipes between said first generator and said resorber for establishing circulation of gas mixture through the highest partial pressure zone vessels, and an intermediate connection between the gas circulation systems of the highest and of the medium partial pressure zone, whereby the amount of mixture flowing through one zone is made different from the amount flowing through the other zone.

13. An absorption refrigerating machine, having several different partial pressure zones in its constituent vessels and containing two generators, a resorber, an evaporator and two absorbers, one of said generators and said resorber belonging to a high partial pressure zone, and one of said absorbers and said evaporator belonging to a low partial pressure zone, while the other generator and the other absorber belong to a medium partial pressure zone, connecting pipes to permit circulation of absorption liquid between said resorber and said evaporator, connecting pipes for establishing a second liquid circuit between said first generator and said second absorber, and connecting pipes for establishing a third liquid circuit between said second generator and said first absorber, the gaseous working medium in all of said vessels having indifferent gas admixed to it, connecting pipes between said evaporator and said first-mentioned absorber for establishing circulation of gas mixture through the lowest partial pressure zone vessels, connecting pipes between said second generator and said second absorber for establishing circulation of gas mixture between the medium partial pressure zone vessels, connecting pipes between said first generator and said resorber for establishing circulation of gas mixture between the highest partial pressure zone vessels, and an intermediate pipe connection between the gas circulation systems of the highest and the medium partial pressure zone, whereby a reciprocal action occurs between the absorption solution and the total amount of indifferent gas mixture in the medium partial pressure zone, but whereby only a portion of this total amount takes part in the reciprocal action with absorption solution in the highest partial pressure zone, including the first generator and the resorber.

14. An absorption refrigerating machine, having several different partial pressure zones in its constituent vessels, and containing two generators, a resorber, an evaporator and two absorbers, one of said generators and said resorber belonging to a high partial pressure zone, and one of the two absorbers and said evaporator belonging to a low partial pressure zone, while the other generator and the other absorber belong to a medium partial pressure zone, connecting pipes to permit circulation of absorption liquid between said resorber and said evaporator, connecting pipes for establishing a second liquid circuit between said first generator and said second absorber, and connecting pipes for establishing a third liquid circuit between said second generator and said first absorber, the gaseous working medium in all of said vessels having indifferent gas admixed to it, connecting pipes between said evaporator and said first-mentioned absorber for establishing circulation of gas mixture through the lowest partial pressure zone vessels, connecting pipes between said second generator and said second absorber for establishing circulation of gas mixture through the medium partial pressure zone vessels, connecting pipes between said first generator and said resorber for establishing circulation of gas mixture through the highest partial pressure zone vessels, and an intermediate connection between said gas circulation systems of the highest and the medium partial pressure zone whereby the amount of mixture flowing through one zone is different from the amount flowing through the other zone, all liquid circulation pipes between the vessels of the several aforestated groups being U-shaped and disposed in heat exchanging relation to one another to circulate absorption solution between the vessel situated in a higher temperature range and the vessel situated in a lower temperature range, and a heating element in each group of pipes attached to the upwardly extending leg of the U-pipe leading to the higher temperature vessel for heating the absorption liquid in said leg.

15. In a continuous absorption refrigerating system using inert gas, an evaporator, an absorber, a plurality of generators, means for circulating inert gas between the evaporator and the absorber and means for causing inert gas to exert a higher partial pressure in one of said generators than in another of said generators.

16. In an absorption refrigerating system using inert gas, a plurality of generators and means for causing the inert gas to exert a higher partial pressure in one of the generators than in another of said generators.

17. In a continuous absorption refrigerating system using inert gas, a generator for expelling refrigerant from an absorption solution, an absorber containing absorption solution, means for causing the solution in the absorber to absorb the refrigerant expelled in the generator, and means using inert gas for causing the generator to operate over a different solution concentration range than that over which the absorber operates, said last mentioned means comprising an auxiliary generator, an auxiliary absorber and means for circulating inert gas between the auxiliary generator and the auxiliary absorber.

18. In a continuous absorption refrigerating system, a multi-stage generator arrangement consisting of vessels arranged to operate at different refrigerant pressures and means using inert gas for maintaining different refrigerant pressures in said vessels.

19. In a continuous absorption refrigerating system, an evaporator, an absorber, a generator, a second absorber, a second generator and a resorber so connected as to enable refrigerant to flow in a cycle therethrough in the order named, means for circulating inert gas through the evaporator and the first mentioned absorber, means for circulating inert gas through the first mentioned generator and the second mentioned absorber and means for circulating inert gas through the second mentioned generator and the resorber.

20. An absorption system including a plurality of generators, a plurality of absorbers, a resorber, an evaporator and conduits interconnecting the same and having a working medium, a solvent for said medium and an inert gas therein, the arrangement being such that the inert gas is present and exerts a partial pressure in at least one of said generators, both of said absorbers and said evaporator.

21. In a continuous absorption refrigerating system using an inert gas, an evaporator, an absorber, a generator, a device for changing refrigerant developed in the generator to a more dense fluid phase, means using inert gas, for conveying refrigerant from said evaporator to said absorber, means using inert gas for conveying refrigerant from said absorber to said generator and means using inert gas for conveying the refrigerant from said generator to said device.

22. An absorption refrigerating system including as essential elements a boiler, a device for changing refrigerant from a gaseous to a more dense fluid phase, an evaporator, an absorber, a second boiler, a second absorber, means for causing refrigerant to flow through said elements in the order named and means for circulating inert gas through certain of said elements.

23. An absorption refrigerating system including as essential elements, a plurality of generators, a plurality of absorbers, a device for changing gaseous refrigerant to a more dense fluid phase, an evaporator and means for circulating inert gas in a circuit through two of said absorbers, one of said generators and said evaporator.

24. In an absorption refrigerating system, a plurality of boilers, means for causing refrigerant to flow through said boilers in series and means for circulating inert gas through one of said boilers.

25. In an absorption refrigerating system, a plurality of boilers, a device for changing gaseous refrigerant to a more dense fluid phase, means for causing refrigerant to flow through said boilers and said device in series and means for circulating inert gas between one of said boilers and said device.

26. In an absorption refrigerating system, an absorber, a boiler, a second absorber and a second boiler, means for circulating absorption solution between said first mentioned absorber and said first mentioned boiler, means for circulating inert gas between said first mentioned boiler and said second absorber and means for circulating absorption solution between said second absorber and said second boiler.

EDMUND ALTENKIRCH.